US012273279B2

(12) United States Patent
Chen et al.

(10) Patent No.: US 12,273,279 B2
(45) Date of Patent: Apr. 8, 2025

(54) CLOUD SOFTWARE SERVICE RESOURCE ALLOCATION METHOD BASED ON QOS MODEL SELF-CORRECTION

(71) Applicant: FU ZHOU UNIVERSITY, Minhou County (CN)

(72) Inventors: Xing Chen, Fujian (CN); Haijiang Wang, Fujian (CN); Fangning Zhu, Fujian (CN)

(73) Assignee: FU ZHOU UNIVERSITY, Fujian (CN)

( * ) Notice: Subject to any disclaimer, the term of this patent is extended or adjusted under 35 U.S.C. 154(b) by 766 days.

(21) Appl. No.: 17/603,269

(22) PCT Filed: Jul. 30, 2019

(86) PCT No.: PCT/CN2019/098255
§ 371 (c)(1),
(2) Date: Oct. 12, 2021

(87) PCT Pub. No.: WO2020/228143
PCT Pub. Date: Nov. 19, 2020

(65) Prior Publication Data
US 2022/0210028 A1    Jun. 30, 2022

(30) Foreign Application Priority Data
May 15, 2019   (CN) ......................... 201910403638.2

(51) Int. Cl.
*H04L 41/14*   (2022.01)
*H04L 41/5009*   (2022.01)
(Continued)

(52) U.S. Cl.
CPC ............ *H04L 47/83* (2022.05); *H04L 41/145* (2013.01); *H04L 41/5009* (2013.01); *H04L 43/55* (2022.05); *H04L 47/82* (2013.01)

(58) Field of Classification Search
CPC ....... H04L 47/83; H04L 43/55; H04L 41/145; H04L 41/5009; H04L 47/82; H04L 67/10;
(Continued)

(56) References Cited

U.S. PATENT DOCUMENTS 7,835,293 B2 * 11/2010 Cidon ................. H04L 43/0852
709/224
10,062,036 B2 * 8/2018 Mermoud ............... H04L 41/16
(Continued)

*Primary Examiner* — Chris Parry
*Assistant Examiner* — Hassan A Khan
(74) *Attorney, Agent, or Firm* — Jose Cherson Weissbrot

(57) ABSTRACT

The present invention relates to a cloud software service resource allocation method based on QoS model self-correction, the method comprising: step S1: performing online self-learning to obtain a QoS prediction model; step S2: collecting runtime data under a certain workload, and improving the accuracy of the QoS prediction model under a current workload through self-correction control; step S3: constructing a fitness function in combination with the quality of service (QoS) and the cloud resource cost (Cost), and searching for a target resource allocation scheme by using an improved particle swarm optimization algorithm; step S4: comparing the current resource allocation situation with the searched target resource allocation scheme to obtain a difference therebetween, and then adjusting resources according to a certain proportion; and step S5: repeating steps S2 to S4 until the current resource allocation situation is the same as the target resource allocation scheme which means that resource adjustment is completed. The present invention can realize a best resource allocation when the QoS prediction model is inaccurate.

5 Claims, 5 Drawing Sheets

(51) Int. Cl.
*H04L 43/55* (2022.01)
*H04L 47/70* (2022.01)
*H04L 47/83* (2022.01)

(58) Field of Classification Search
CPC ... H04L 41/5054; H04L 41/50; H04L 41/147;
H04L 41/0896; H04L 41/0886; H04L
41/0806; H04L 43/20; H04L 41/0895
See application file for complete search history.

(56) References Cited

U.S. PATENT DOCUMENTS

| | | | |
|---|---|---|---|
| 10,171,332 B2* | 1/2019 | Mermoud | H04L 43/04 |
| 10,389,613 B2* | 8/2019 | Dasgupta | H04L 43/16 |
| 10,708,144 B2* | 7/2020 | Mohan | H04L 43/10 |
| 10,757,121 B2* | 8/2020 | Dasgupta | H04L 63/1425 |
| 11,429,893 B1* | 8/2022 | Tong | G06N 20/00 |
| 11,553,038 B1* | 1/2023 | Rakshit | G06N 20/00 |
| 2009/0094605 A1* | 4/2009 | Brelsford | G06F 9/4843 |
| | | | 718/100 |
| 2017/0325120 A1* | 11/2017 | Szilagyi | H04L 41/5025 |
| 2021/0092036 A1* | 3/2021 | Jain | H04L 65/80 |
| 2021/0168068 A1* | 6/2021 | Shenoy | H04L 45/64 |
| 2021/0337555 A1* | 10/2021 | Fan | H04W 72/543 |
| 2022/0271999 A1* | 8/2022 | Jeong | H04W 16/28 |
| 2024/0154852 A1* | 5/2024 | Karapantelakis | H04L 41/16 |

* cited by examiner

Algorithm 1: Decision-making algorithm for resource adjustment

```
1:  function COMPUTE_VM_ADJUSTEMENT (int[] VM_Difference)
2:      init Proportion
3:      if all( VM_Difference) == 0 then
4:          return null
5:      else
6:          VM_sum = sum( VM_Difference)
7:          if VM_sum > 0 then
8:              for int index : VM_Difference.indexSet() do
9:                  if VM_Difference(index) > 0 then
10:                     VM_Adjustement (index) = Intpart( VM_Difference (index) * Proportion )
11:                 else
12:                     VM_Adjustement (index) = 0
13:                 end if
14:             end for
15:         else
16:             for int index : VM_Difference.indexSet() do
17:                 if VM_Difference (index) < 0 then
18:                     VM_Adjustement (index) = Intpart( VM_Difference (index) * Proportion )
19:                 else
20:                     VM_Adjustement (index) = 0
21:                 end if
22:             end for
23:         end if
24:         return VM_Adjustement
25:     end if
26: end function
```

FIG. 5

CLOUD SOFTWARE SERVICE RESOURCE ALLOCATION METHOD BASED ON QOS MODEL SELF-CORRECTION

FIELD OF TECHNOLOGY

The present invention relates to the field of cloud computing, and in particular to a cloud software service resource allocation method based on QoS model self-correction.

BACKGROUND

Self-adaption is an effective way to allocate resources of a cloud-based software service. A traditional adaptive resource allocation method is rule-driven, leading to a high management cost and implementation complexity. Machine learning technology and control theory are two solutions to reduce labor costs. However, the machine learning technology requires a large amount of historical data to construct an accurate QoS prediction model, which easily leads to a resource allocation error; and the method based on the control theory requires a large amount of feedback iterations to find a suitable resource allocation plan, resulting in a high overhead for stopping virtual machines.

SUMMARY

In view of this, the purpose of the present invention is to propose a cloud software service resource allocation method based on QoS model self-correction, which can realize a best resource allocation when a QoS prediction model is inaccurate.

The present invention is realized with the following solutions: a cloud software service resource allocation method based on QoS model self-correction, specifically comprising the following steps:

step S1: performing online self-learning to obtain a QoS prediction model;

step S2: collecting runtime data under a certain workload, and improving the accuracy of the QoS prediction model under a current workload through self-correction control; and, once virtual machine resources are re-adjusted, starting to collect the runtime data, similarly, including information such as workloads, allocated resources, and QoS values;

step S3: constructing a fitness function in combination with the quality of service (QoS) and the cloud resource cost (Cost), and searching for a target resource allocation scheme by using an improved particle swarm optimization algorithm, wherein the target resource allocation scheme is actually based on a global best solution of the fitness function;

step S4: comparing the current resource allocation situation with the searched target resource allocation scheme to obtain a difference therebetween, and then adjusting resources according to a certain proportion wherein virtual machines are added or deleted one by one, and each time one virtual machine is added or deleted, the runtime data of a cloud software service is collected;

step S5: repeating steps S2 to S4 until the current resource allocation situation is the same as the target resource allocation scheme which means that resource adjustment is completed.

Further, step S1 specifically comprises: first, establishing a service quality mapping function for response time, so that the quality of service can be better reflected; and then establishing, through machine learning, a relationship model among the workloads, the allocated resources and the quality of service, and initializing the obtained QoS prediction model for a next step S2.

Further, in step S1, the QoS prediction model takes a load request situation (R) (including types and quantity) and an allocated virtual machine situation (VM) as inputs, and takes the quality of service (QoS) (a mapping value of the response time RT) as an output, so as to establish a unified nonlinear regression model as shown in the following formula:

$$QoS = \sum_{l=0}^{m+n} w_l x_{c,1}^{p_l}; \quad (1)$$

The above formula is a general expression of nonlinear regression, wherein the independent variable X is a set of load requests R and virtual machine allocation situations VM; as shown in table 1, the workload, i.e., $R=\{x_{c,1}, x_{c,2}, \ldots, x_{c,n}\}$, denotes that there are n types of the load requests, wherein $x_{c,l}$ denotes the quantity of the lth type of the load requests; the resource allocation situations are $VM=\{x_{c,n+1}, x_{c,n+2}, x_{c,n+m}\}$, denoting that there are m types of virtual machines, wherein $x_{c,n+1}$ denotes the quantity of the lth type of the virtual machines; the exponential variable Parameter=$\{p_1, p_2, \ldots, p_{n+m}\}$ is an exponential parameter of the independent variable X and can be set to different values according to characteristics and requirements of each cloud software service; and, when values of Parameter are all 1, the above formula becomes a linear regression model, and the parameter $W=\{w_0, w_1, \ldots, w_{n+m}\}$ in the formula is the parameter required to be solved and corrected. For a service quality prediction model with low accuracy, its runtime data under a certain workload can be collected, as shown in Table 1; and, based on a self-correction control theory, a difference between a predicted value and a true value is minimized, so as to realize a re-estimation and re-tuning of an original parameter W.

TABLE 1

Dataset of QoS prediction model self-correction

| R | VM | QoS$_{predicted}$ | QoS$_{actual}$ |
|---|---|---|---|
| $x_{1,1}, x_{1,2}, \ldots, x_{1,n}$ | $x_{1,n+1}, x_{1,n+2}, \ldots, x_{1,n+m}$ | $y_1$ | $y_1$ |
| $x_{2,1}, x_{2,2}, \ldots, x_{2,n}$ | $x_{2,n+1}, x_{2,n+2}, \ldots, x_{2,n+m}$ | $y_2$ | $y_2$ |
| ... | ... | ... | ... |
| $x_{c,1}, x_{c,2}, \ldots, x_{c,n}$ | $x_{c,n+1}, x_{c,n+2}, \ldots, x_{c,n+m}$ | $y_c$ | $y_c$ |

Further, step S2 comprises two parts: parameter recursive estimation and parameter calculation, wherein the parameter recursive estimation is continuously estimating parameters of the QoS prediction model based on input and output information of the system; and the parameter calculation is calculating and tuning (usually tuning according to a proportion) parameters of the QoS prediction model and new parameter estimates, and updating the QoS prediction model with final calculation results to make the prediction performance of the QoS prediction model reach a best state or approach a best state.

Further, step S2 specifically comprises the following steps:

step S21: for the certain workload, in a continuous resource adjustment process, assuming that u groups of the runtime data are collected, including the workloads, the virtual machine allocation situation and actual values QoS$_{actual}$ of QoS; based on the workloads and the virtual machine allocation situation, obtaining the following u QoS prediction equations according to a formula $$QoS = \sum_{l=0}^{m+n} w_l x_{c,l}^{p_i};$$

$$QoS_{predicted\ 1} = w_0 + w_1 x_{1,1}^{P1} + w_2 x_{1,2}^{P2} + \ldots + w_{n+m} x_{1,n+m}^{Pn+m} \quad (2)$$

$$QoS_{predicted\ 2} = w_0 + w_1 x_{2,1}^{P1} + w_2 x_{2,2}^{P2} + \ldots + w_{n+m} x_{2,n+m}^{Pn+m}$$

$$QoS_{predicted\ 3} = w_0 + w_1 x_{3,1}^{P1} + w_2 x_{3,2}^{P2} + \ldots + w_{n+m} x_{3,n+m}^{Pn+m}$$

...

$$QoS_{predicted\ u} = w_0 + w_1 x_{1,1}^{P1} + w_2 x_{1,2}^{P2} + \ldots + w_{n+m} x_{1,n+m}^{Pn+m};$$

for a known QoS prediction model, the index variable Parameter is fixed and is not an object that needs to be corrected and concerned on in the present invention;

step S22: denoting formula (2) in a vector-matrix form as follows:

$$\begin{bmatrix} QoS_{predicted\ 1} \\ QoS_{predicted\ 2} \\ QoS_{predicted\ 3} \\ \vdots \\ QoS_{predicted\ u} \end{bmatrix} = \begin{bmatrix} 1 & x_{1,1}^{P1} & x_{1,2}^{P2} & \cdots & x_{1,n+m}^{Pn+m} \\ 1 & x_{2,1}^{P1} & x_{2,2}^{P2} & \cdots & x_{2,n+m}^{Pn+m} \\ 1 & x_{3,1}^{P1} & x_{3,2}^{P2} & \cdots & x_{3n+m}^{Pn+m} \\ \vdots & \vdots & \vdots & \vdots & \vdots \\ 1 & x_{u,1}^{P1} & x_{u,2}^{P2} & \cdots & x_{u,n+m}^{Pn+m} \end{bmatrix} \times \begin{bmatrix} w_0 \\ w_1 \\ w_2 \\ \vdots \\ w_{n+m} \end{bmatrix}; \quad (3)$$

letting Y denote a vector composed of u predicted output QoS values, wherein W is a parameter vector of n+m+1 dimensions, and, Φ denote a input matrix of u*(n+m+1) dimensions, that is, letting:

$$Y = \begin{bmatrix} QoS_{predicted\ 1} \\ QoS_{predicted\ 2} \\ QoS_{predicted\ 3} \\ \vdots \\ QoS_{predicted\ u} \end{bmatrix}, W = \begin{bmatrix} w_0 \\ w_1 \\ w_2 \\ \vdots \\ w_{n+m} \end{bmatrix}, \Phi = \begin{bmatrix} 1 & x_{1,1}^{P1} & x_{1,2}^{P2} & \cdots & x_{1,n+m}^{Pn+m} \\ 1 & x_{2,1}^{P1} & x_{2,2}^{P2} & \cdots & x_{2,n+m}^{Pn+m} \\ 1 & x_{3,1}^{P1} & x_{3,2}^{P2} & \cdots & x_{3n+m}^{Pn+m} \\ \vdots & \vdots & \vdots & \vdots & \vdots \\ 1 & x_{u,1}^{P1} & x_{u,2}^{P2} & \cdots & x_{u,n+m}^{Pn+m} \end{bmatrix}; \quad (4)$$

simplifing formula (3) into the following vector-matrix equation:

$$Y = \Phi W \quad (5);$$

for the collected actual quality of service values and actual values QoS$_{actual}$, it is a best estimate of QoS$_{predicted}$, indicated as Y; let W denote a best estimate of W, then:

$$Y = \Phi W \quad (6);$$

step S23: performing parameter estimation by using a least square method, wherein the squared difference of the residual between the predicted QoS value and the actual QoS value needs to be minimized; and wherein a vector form of the residual is expressed as follows:

$$e = \begin{bmatrix} e_1 \\ e_2 \\ e_3 \\ \vdots \\ e_u \end{bmatrix} = \begin{bmatrix} QoS_{predicted\ 1} - QoS_{actual\ 1} \\ QoS_{predicted\ 2} - QoS_{actual\ 1} \\ QoS_{predicted\ 3} - QoS_{actual\ 1} \\ \vdots \\ QoS_{predicted\ u} - QoS_{actual\ 1} \end{bmatrix}; \quad (7)$$

the squared difference of the residual, that is, the index function is denoted as follows:

$$J = e^T e = (Y - \Phi W)^T (Y - \Phi W) \quad (8);$$

taking a derivative of J by W that is, taking $$\frac{\partial J}{\partial W},$$

so that W can be solved out;

The parameter calculation is to calculate and set a new parameter vector for the QoS prediction model. W It requires a trade-off between an original parameter vector W and a personal best parameter vector W, and the direct use of the personal best coefficient vector W would make the QoS prediction model fall into the personal best, that is, under other workloads, the accuracy of the QoS prediction model is possible to be inaccurate.

step S24: performing a proportion tuning on the original coefficient vector W and the W (the personal best coefficient vector) obtained in step S23, as shown in the following formula:

$$W = \eta W + (1-\eta) W \quad (9);$$

wherein η is a parameter which can be set by an expert according to requirements of different systems, and a higher value of γ indicates a higher confidence proportion to the original parameter.

Further, PSO is a computing technology based on swarm intelligence. It usually quickly converges to a personal best solution, but loses an opportunity to find a better solution in a global scope. The genetic algorithm is a meta-heuristic algorithm inspired by a natural selection process, and is usually used to generate a high-quality global best solution. The present invention introduces an idea of the genetic algorithm and proposes an improved PSO algorithm, which has a faster convergence speed and a better global search ability. A traditional PSO solves the problem through a candidate particle swarm. The particles continuously move and update themselves in a solution space according to a simple mathematical formula about position and speed. The movement of each particle is affected by a known personal best position (i.e., a personal best particle) and a global best position (i.e., a global best particle), thereby prompting some better positions to be discovered by the updated particles, i.e., the particle swarm would continue to evolve and update towards a best direction, so as to achieve a best solution.

The present invention proposes an improved particle swarm algorithm which uses an update strategy of a genetic algorithm, including mutation and crossover calculation, to replace the movement of particles. Step S3 specifically comprises the following steps:

step S31: for the coding of a cloud software service resource allocation problem, utilizing a discrete coding method to encode the particles of the PSO in the present invention. Assuming that there are m types of virtual machines, the quantity of each type of virtual machines is expressed as $vm_l$, wherein $1 \leq l \leq m$, then defining the particle coding of a certain resource allocation scheme as the following formula:

$$VM = \{vm_1, vm_2, vm_3, \ldots, vm_m\} \quad (10)$$

initializing the values of related parameters, including but not limited to a particle swarm size, a maximum number of iterations and an initial particle swarm size;

step S32: calculating a fitness value of each particle according to the following formula, setting each particle as its own personal best particle, and setting the particle with a minimum fitness value as a global best particle:

$$\text{Fitness} = \text{Objective} \quad (11)$$
$$= r_1 \frac{1}{QoS} + r_2 \text{Cost};$$

wherein $r_1$ denotes trade-off of the quality of service (QoS), and $r_2$ denotes trade-off of the cloud resource cost; the fitness function is a direction that guides the particle swarm optimization algorithm to search and solve, and has the same meaning as a management objective function of the present invention. Therefore, the management objective function is directly used as the fitness function of the particle swarm algorithm, as in formula (11). A better resource allocation scheme should get a smaller fitness function value.

step S33: updating the particles according to the mutation and crossover calculations, and recalculating a fitness value of each particle;

step S34: if the fitness value of the updated particle is better than its personal best particle, replacing the personal best particle with the updated particle;

step S35: if the fitness value of the updated particle is better than a global best particle, replacing the global best particle with the updated particle;

step S36: returning to step S33 until a stop condition is met, such as a maximum number of iterations is reached.

Preferably, in the present invention, the update strategy of particles mainly adopts the mutation and crossover.

For the update strategy of the particles, the mutation and crossover are mainly employed.

For the mutation strategy, the mutation is to randomly select a locus in an ancestor particle, and then mutate the value of that locus to form a new particle. For the value of a certain locus, two mutation cases are designed: increasing by 1, and decreasing by 1, and the probability of each case is ½. For example, supposing there are three types of the virtual machines, and the particle before the mutation is (1, 2, 6). After the mutation operation, new particle (1, 2, 7) is produced. That is, the value of a third locus in the ancestor particle has increased by 1.

For the crossover strategy, the crossover consists of two steps. First, for a certain particle, randomly selecting two locuses in the particle, replacing a fragment therebetween with the corresponding fragment in the personal best particle, and generating an intermediate temporary particle. Second, randomly selecting two locuses in the temporary particle, and replacing a fragment therebetween with the corresponding fragment in the global best particle to generate a new particle. For example, it is known that the ancestor particle is (1, 2, 7), the personal best particle is (0, 2, 6), and the global best particle is (0, 2, 5). First, performing the crossover on the fragment between the first locus and second locus of the ancestor particle and the personal best particle to generate the intermediate temporary particle (0, 2, 7); and then performing the crossover on the fragment between the second locus and third locus of the temporary particle and the global best particle, so as to generate the new particle (0, 2, 5). Such crossover calculation ensures that the particle swarm would gradually evolve towards a best direction.

Furthermore, the accuracy of the QoS prediction model is gradually improved, and the resulted target resource allocation scheme usually also changes. If the resource adjustment is carried out completely in accordance with the target allocation scheme, in each circulation, it is very likely that the virtual machines will be dynamically started or stopped, which leads to rising resource costs. Therefore, according to the difference between the allocated resource situation and the target allocation scheme in each circulation, the resource adjustment is made according to a certain proportion to gradually approach the best resource allocation scheme so as to reduce additional costs caused by startup of unnecessary virtual machines or stop of rented virtual machines.

Step S4 specifically comprises the following steps:

step S41: using formula (12) to denote the allocated resources situation $VM_{allocated}$, while using formula (13) to represent the target allocation scheme $VM_{Objective}$ obtained in each circulation, and denoting the difference $VM_{Difference}$ between the allocated resource situation $VM_{allocated}$ and the target allocation scheme $VM_{objective}$ by formula (14):

$$VM_{allocated} = \{vm_1^A, vm_2^A, vm_3^A, \ldots, vm_m^A\} \quad (12);$$

$$VM_{Objective} = \{vm_1^O, vm_2^O, vm_3^O, \ldots, vm_m^O\} \quad (13);$$

$$VM_{Difference} = \{vm_1^A - vm_1^O, vm_2^A - vm_2^O, vm_3^A - vm_3^O, \ldots, vm_m^A - vm_m^O\} \quad (14);$$

step S42: calculating an overall change trend between the allocated resource situation and the target allocation scheme in each circulation by using the following formula:

$$VM_{sum} = \sum_{l=1}^{m} VM_{Difference}(l); \quad (15)$$

when $VM_{sum} > 0$, it denotes that virtual machine resources of the cloud software service as a whole need to be increased, and the quantity of virtual machines are not reduced at this time; and when $VM_{sum} < 0$, it denotes that the virtual machine resources of the cloud software service have a remaining computing power, and the quantity of the virtual machines needs to be appropriately reduced instead of increasing the quantity of the virtual machines at this time;

step S43: assuming that the resource adjustment proportion is Proportion, and 0<Proportion<1, in order to ensure that the quantity adjusted each time for each type of the virtual machines is an integer, performing a rounding operation. As shown in formula (16), it is the quantity of the lth type of the virtual machines that needs to be adjusted, and, when VMAdjustement>0, it denotes adding VMAdjustement virtual machines of this type; on the contrary, VMAdjustement virtual machines of this type are reduced; wherein Intpart( ) is a rounding function, its meaning is as in formula (17). For a certain value a, if it is greater than or equal to 0, it is rounded up: if it is negative, it is rounded down.

$$VM_{adjustment}(l) = Intpart(VM_{Difference}(l) * Proportion); \quad (16)$$

$$intpart(a) = \begin{cases} a, & a \geq 0 \\ -intpart(-a), & a < 0 \end{cases}. \quad (17)$$

In summary, the method of the present invention is mainly composed of two parts: first, based on the runtime data, through the self-correction control, modifying and improving the QoS prediction model; second, based on the difference between the allocated resource situation and the target resource allocation scheme, performing the resource adjustments according to the certain proportion. In the present invention, an RUBiS software service is built on a Cloud-Stack cloud platform to conduct experiments, and experimental results show the feasibility and effectiveness of the method.

Compared with the prior art, the present invention has the following beneficial effects: with regard to the problem of the adaptive resource allocation of the cloud software service, the present invention considers how to achieve the best resource allocation when the dataset is not complete and the QoS prediction model is inaccurate. With regard to this problem, a resource allocation method based on QoS model self-correction is proposed in the present invention. First, the self-correction control theory is adopted to continuously correct the QoS prediction model based on the runtime data, so that its accuracy under the given workload is effectively improved; then, the control theory is introduced and a feedback control loop is applied to a resource adjustment decision-making process. The step-by-step adjustment strategy can not only gradually approach the best resource allocation scheme, but also effectively reduce the additional overhead caused by starting the unnecessary virtual machines or stopping the rented virtual machines.

BRIEF DESCRIPTION OF THE DRAWINGS

FIG. 5 is a schematic diagram of a resource adjustment decision-making algorithm code according to an embodiment of the present invention.

DESCRIPTION OF THE EMBODIMENTS

The present invention will be further described below in conjunction with the accompany drawings and embodiments.

It should be pointed out that the following detailed description is exemplary and aims to provide a further description of this application. Unless otherwise specified, all technical and scientific terms used herein have the same meaning as commonly understood by those of ordinary skill in the technical field to which this application belongs.

It should be noted that the terms used herein are only for describing specific implementations, and are not intended to limit the exemplary implementations according to the present application. As used herein, unless the context clearly indicates otherwise, the singular form is also intended to include the plural form. In addition, it should also be understood that when the terms "comprising" and/or "including" are used in this specification, they indicate that there are features, steps, operations, devices, components, and/or combinations thereof.

Figure 1:
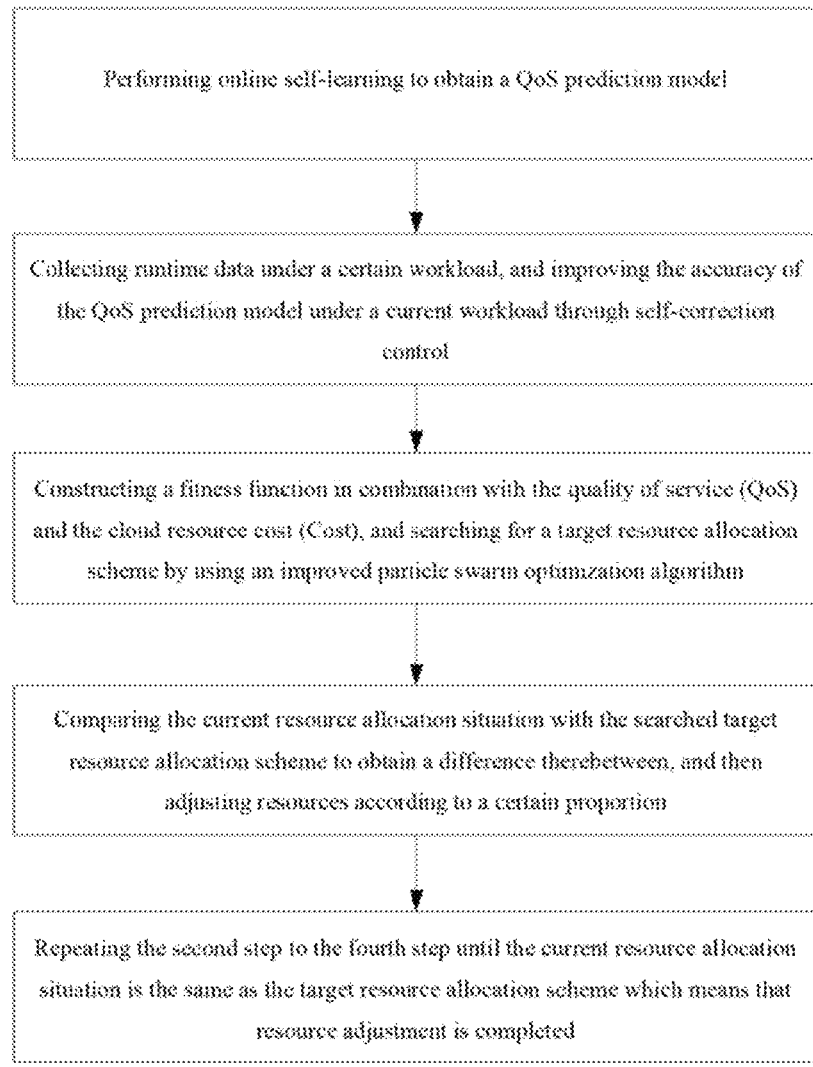
FIG. 1 is a schematic flowchart of a method according to an embodiment of the present invention.

As shown in FIG. 1, a cloud software service resource allocation method based on QoS model self-correction is provided in the present embodiment and the method comprises the following steps:

step S1: performing online self-learning to obtain a QoS prediction model;

step S2: collecting runtime data under a certain workload, and improving the accuracy of the QoS prediction model under a current workload through self-correction control; and, once virtual machine resources are re-adjusted, starting to collect the runtime data, similarly, including information such as workloads, allocated resources, and QoS values;

step S3: constructing a fitness function in combination with the quality of service (QoS) and the cloud resource cost (Cost), and searching for a target resource allocation scheme by using an improved particle swarm optimization algorithm, wherein the target resource allocation scheme is actually based on a global best solution of the fitness function;

step S4: comparing the current resource allocation situation with the searched target resource allocation scheme to obtain a difference therebetween, and then adjusting resources according to a certain proportion wherein virtual machines are added or deleted one by one, and each time one virtual machine is added or deleted, the runtime data of a cloud software service is collected;

step S5: repeating steps S2 to S4 until the current resource allocation situation is the same as the target resource allocation scheme which means that resource adjustment is completed.

In the present embodiment, step S1 specifically comprises: first, establishing a service quality mapping function for response time, so that the quality of service can be better reflected; and then establishing, through machine learning, a relationship model among the workloads, the allocated resources and the quality of service, and initializing the obtained QoS prediction model for a next step S2.

In the present embodiment, in step S1, the QoS prediction model takes a load request situation (R) (including types and quantity) and an allocated virtual machine situation (VM) as inputs, and takes the quality of service (QoS) (a mapping value of the response time RT) as an output, so as to establish a unified nonlinear regression model as shown in the following formula:

$$QoS = \sum_{l=0}^{m+n} w_l x_{c,1}^{p_i}; \quad (1)$$

The above formula is a general expression of nonlinear regression, wherein the independent variable X is a set of load requests R and virtual machine allocation situations VM; as shown in table 1, the workload, i.e., R={$x_{c,1}, x_{c,2}, \ldots, x_{c,n}$}, denotes that there are n types of the load requests, wherein $x_{c,l}$ denotes the quantity of the lth type of the load requests; the resource allocation situations are VM={$x_{c,n+1}, x_{c,n+2}, x_{c,n+m}$}, denoting that there are m types of virtual machines, wherein $x_{c,n+1}$ denotes the quantity of the lth type of the virtual machine; the exponential variable Parameter={$p_1, p_2, \ldots, p_{n+m}$} is an exponential parameter of the independent variable X and can be set to different values according to characteristics and requirements of each cloud software service; and, when values of Parameter are all 1, the above formula becomes a linear regression model, and the parameter W={$w_0, w_1, \ldots, w_{n+m}$} in the formula is the parameter required to be solved and corrected. For a service quality prediction model with low accuracy, its runtime data under a certain workload can be collected, as shown in Table 1; and, based on a self-correction control theory, a difference between a predicted value and a true value is minimized, so as to realize a re-estimation and re-tuning of an original parameter W.

TABLE 1

Dataset of QoS prediction model self-correction

| R | VM | $QoS_{predicted}$ | $QoS_{actual}$ |
|---|---|---|---|
| $x_{1,1}, x_{1,2}, \ldots, x_{1,n}$ | $x_{1,n+1}, x_{1,n+2}, \ldots, x_{1,n+m}$ | $y_1$ | $y_1'$ |
| $x_{2,1}, x_{2,2}, \ldots, x_{2,n}$ | $x_{2,n+1}, x_{2,n+2}, \ldots, x_{2,n+m}$ | $y_2$ | $y_2'$ |
| ... | ... | ... | ... |
| $x_{c,1}, x_{c,2}, \ldots, x_{c,n}$ | $x_{c,n+1}, x_{c,n+2}, \ldots, x_{c,n+m}$ | $y_c$ | $y_c'$ |

Figure 2:
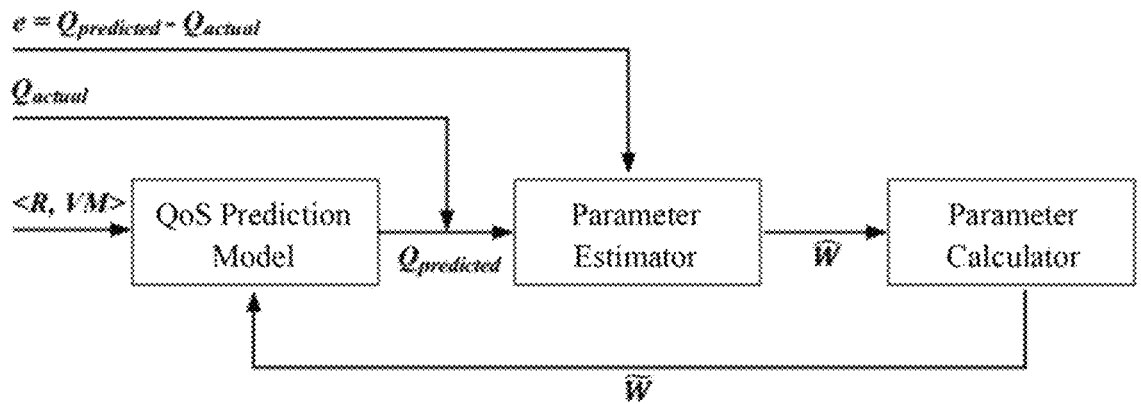
FIG. 2 is a block diagram of the self-correction control principle of an embodiment of the present invention.

In the present embodiment, as shown in FIG. 2, step S2 comprises two parts: parameter recursive estimation and parameter calculation, wherein the parameter recursive estimation is continuously estimating parameters of the QoS prediction model based on input and output information of the system; and the parameter calculation is calculating and tuning (usually tuning according to a proportion) parameters of the QoS prediction model and new parameter estimates, and updating the QoS prediction model with final calculation results to make the prediction performance of the QoS prediction model reach a best state or approach a best state.

In this embodiment, step S2 specifically comprises the following steps:

step S21: for the certain workload, in a continuous resource adjustment process, assuming that u groups of the runtime data are collected, including the workloads, the virtual machine allocation situation and actual values $QoS_{actual}$ of QoS; based on the workloads and the virtual machine allocation situation, obtaining the following u QoS prediction equations according to a formula $$QoS = \sum_{l=0}^{m+n} w_l x_{c,1}^{p_i}:$$

$$QoS_{predicted\ 1} = w_0 + w_1 x_{1,1}^{p_1} + w_2 x_{1,2}^{p_2} + \ldots + w_{n+m} x_{1,n+m}^{p_{n+m}} \quad (2)$$

$$QoS_{predicted\ 2} = w_0 + w_1 x_{2,1}^{p_1} + w_2 x_{2,2}^{p_2} + \ldots + w_{n+m} x_{2,n+m}^{p_{n+m}}$$

$$QoS_{predicted\ 3} = w_0 + w_1 x_{3,1}^{p_1} + w_2 x_{3,2}^{p_2} + \ldots + w_{n+m} x_{3,n+m}^{p_{n+m}}$$

...

$$QoS_{predicted\ u} = w_0 + w_1 x_{1,1}^{p_1} + w_2 x_{1,2}^{p_2} + \ldots + w_{n+m} x_{1,n+m}^{p_{n+m}};$$

For a known QoS prediction model, the index variable Parameter is fixed and is not an object that needs to be corrected and concerned on in the present invention;

step S22: denoting formula (2) in a vector-matrix form as follows:

$$\begin{bmatrix} QoS_{predicted\ 1} \\ QoS_{predicted\ 2} \\ QoS_{predicted\ 3} \\ \vdots \\ QoS_{predicted\ u} \end{bmatrix} = \begin{bmatrix} 1 & x_{1,1}^{p_1} & x_{1,2}^{p_2} & \cdots & x_{1,n+m}^{p_{n+m}} \\ 1 & x_{2,1}^{p_1} & x_{2,2}^{p_2} & \cdots & x_{2,n+m}^{p_{n+m}} \\ 1 & x_{3,1}^{p_1} & x_{3,2}^{p_2} & \cdots & x_{3n+m}^{p_{n+m}} \\ \vdots & \vdots & \vdots & \vdots & \vdots \\ 1 & x_{u,1}^{p_1} & x_{u,2}^{p_2} & \cdots & x_{u,n+m}^{p_{n+m}} \end{bmatrix} \times \begin{bmatrix} w_0 \\ w_1 \\ w_2 \\ \vdots \\ w_{n+m} \end{bmatrix}; \quad (3)$$

letting Y denote a vector composed of u predicted output QoS values, wherein W is a parameter vector of n+m+1 dimensions, and, $\Phi$ denote a input matrix of u*(n+m+1) dimensions, that is, letting:

$$Y = \begin{bmatrix} QoS_{predicted\ 1} \\ QoS_{predicted\ 2} \\ QoS_{predicted\ 3} \\ \vdots \\ QoS_{predicted\ u} \end{bmatrix}, W = \begin{bmatrix} w_0 \\ w_1 \\ w_2 \\ \vdots \\ w_{n+m} \end{bmatrix}, \Phi = \begin{bmatrix} 1 & x_{1,1}^{p_1} & x_{1,2}^{p_2} & \cdots & x_{1,n+m}^{p_{n+m}} \\ 1 & x_{2,1}^{p_1} & x_{2,2}^{p_2} & \cdots & x_{3,n+m}^{p_{n+m}} \\ 1 & x_{3,1}^{p_1} & x_{3,2}^{p_2} & \cdots & x_{3n+m}^{p_{n+m}} \\ \vdots & \vdots & \vdots & \vdots & \vdots \\ 1 & x_{u,1}^{p_1} & x_{u,2}^{p_2} & \cdots & x_{u,n+m}^{p_{n+m}} \end{bmatrix} \quad (4)$$

simplifing formula (3) into the following vector-matrix equation:

$$Y = \Phi W \quad (5);$$

for the collected actual quality of service values and actual values $QoS_{actual}$, it is a best estimate of $QoS_{predicted}$, indicated as Y; let W denote a best estimate of W, then:

$$Y = \Phi W \quad (6);$$

step S23: performing parameter estimation by using a least square method, wherein the squared difference of the residual between the predicted QoS value and the actual QoS value needs to be minimized; and wherein a vector form of the residual is expressed as follows:

$$e = \begin{bmatrix} e_1 \\ e_2 \\ e_3 \\ \vdots \\ e_u \end{bmatrix} = \begin{bmatrix} QoS_{predicted\,1} - QoS_{actual\,1} \\ QoS_{predicted\,2} - QoS_{actual\,1} \\ QoS_{predicted\,3} - QoS_{actual\,1} \\ \vdots \\ QoS_{predicted\,u} - QoS_{actual\,1} \end{bmatrix}; \qquad (7)$$

the squared difference of the residual, that is, the index function is denoted as follows:

$$J = e^T e = (Y - \Phi W)^T (Y - \Phi W) \qquad (8);$$

taking a derivative of J by W, that is, taking $$\frac{\partial J}{\partial W},$$

so that W can be solved out;

The parameter calculation is to calculate and set a new parameter vector for the QoS prediction model. W It requires a trade-off between an original parameter vector W and a personal best parameter vector W, and the direct use of the personal best coefficient vector W would make the QoS prediction model fall into the personal best, that is, under other workloads, the accuracy of the QoS prediction model is possible to be inaccurate.

step S24: performing a proportion tuning on the original coefficient vector W and the W (the personal best coefficient vector) obtained in step S23, as shown in the following formula:

$$W = \eta W + (1 - \eta) W \qquad (9);$$

wherein $\eta$ is a parameter which can be set by an expert according to requirements of different systems, and a higher value of $\eta$ indicates a higher confidence proportion to the original parameter.

In the present embodiment, PSO is a computing technology based on swarm intelligence. It usually quickly converges to a personal best solution, but loses an opportunity to find a better solution in a global scope. The genetic algorithm is a meta-heuristic algorithm inspired by a natural selection process, and is usually used to generate a high-quality global best solution. The present invention introduces an idea of the genetic algorithm and proposes an improved PSO algorithm, which has a faster convergence speed and a better global search ability. A traditional PSO solves the problem through a candidate particle swarm. The particles continuously move and update themselves in a solution space according to a simple mathematical formula about position and speed. The movement of each particle is affected by a known personal best position (i.e., a personal best particle) and a global best position (i.e., a global best particle), thereby prompting some better positions to be discovered by the updated particles, i.e., the particle swarm would continue to evolve and update towards a best direction, so as to achieve a best solution.

The present embodiment proposes an improved particle swarm algorithm, which uses an update strategy of a genetic algorithm, including mutation and crossover calculations, to replace the movement of particles. Step S3 specifically comprises the following steps:

step S31: for the coding of a cloud software service resource allocation problem, utilizing a discrete coding method to encode the particles of the PSO in the present invention. Assuming that there are m types of virtual machines, the quantity of each type of virtual machines is expressed as $vm_1$, wherein $1 \leq l \leq m$, then defining the particle coding of a certain resource allocation scheme as the following formula:

$$VM = \{vm_1, vm_2, vm_3, \ldots, vm_m\} \qquad (10);$$

initializing the values of related parameters, including but not limited to a particle swarm size, a maximum number of iterations and an initial particle swarm size;

step S32: calculating a fitness value of each particle according to the following formula, setting each particle as its own personal best particle, and setting the particle with a minimum fitness value as a global best particle:

$$\text{Fitness} = \text{Objective} \qquad (11)$$
$$= r_1 \frac{1}{QoS} + r_2 \text{Cost};$$

wherein $r_1$ denotes trade-off of the quality of service (QoS), and $r_2$ denotes trade-off of the cloud resource cost; the fitness function is a direction that guides the particle swarm optimization algorithm to search and solve, and has the same meaning as a management objective function of the present invention. Therefore, the management objective function is directly used as the fitness function of the particle swarm algorithm, as in formula (11). A better resource allocation scheme should get a smaller fitness function value.

step S33: updating the particles according to the mutation and crossover calculations, and recalculating a fitness value of each particle;

step S34: if the fitness value of the updated particle is better than its personal best particle, replacing the personal best particle with the updated particle;

step S35: if the fitness value of the updated particle is better than a global best particle, replacing the global best particle with the updated particle;

step S36: returning to step S33 until a stop condition is met, such as a maximum number of iterations is reached.

Preferably, in the present invention, the update strategy of particles mainly adopts the mutation and crossover.

For the update strategy of particles, the mutation and crossover are mainly employed.

Figure 3:
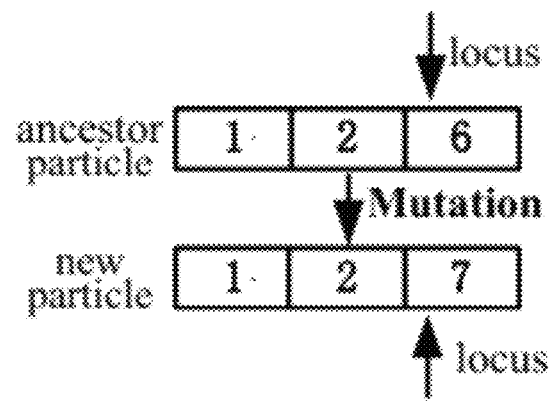
FIG. 3 is a schematic diagram of an individual mutation strategy of an improved particle swarm algorithm according to an embodiment of the present invention.

For the mutation strategy, the mutation is to randomly select a locus in an ancestor particle, and then mutate the value of that locus to form a new particle. For the value of a certain locus, two mutation cases are designed: increasing by 1, and decreasing by 1, and the probability of each case is ½. As shown in FIG. 3, assuming that there are three types of virtual machines, and the particle before the mutation is (1, 2, 6). After the mutation operation, new particle (1, 2, 7) is produced. That is, the value of a third locus in the ancestor particle has increased by 1.

Figure 4:
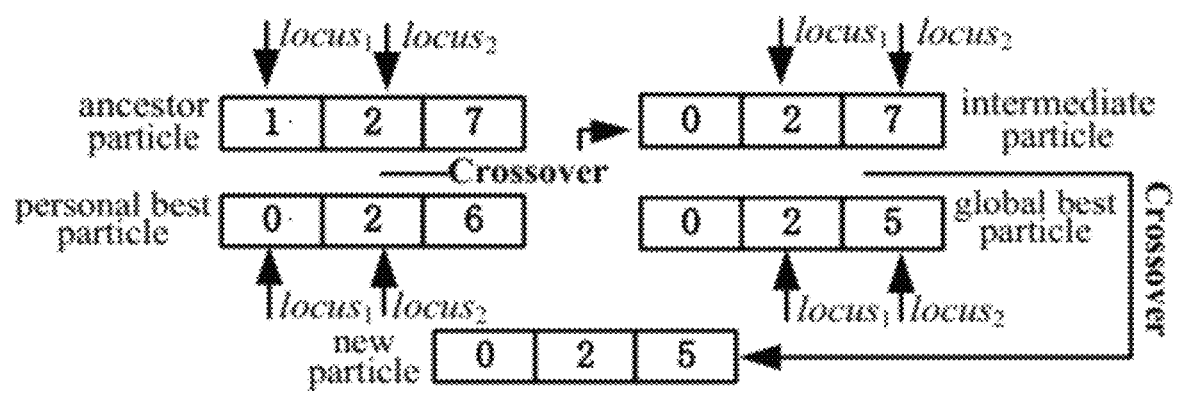
FIG. 4 is a schematic diagram of an individual crossover strategy of an improved particle swarm algorithm according to an embodiment of the present invention.

For the crossover strategy, the crossover consists of two steps. First, for a certain particle, randomly selecting two locuses in the particle, replacing a fragment therebetween with the corresponding fragment in the personal best particle, and generating an intermediate temporary particle. Second, randomly selecting two locuses in the temporary particle, and replacing a fragment therebetween with the corresponding fragment in the global best particle to generate a new particle. As shown in FIG. 4 which illustrates a crossover calculation process, it is known that the ancestor particle is (1, 2, 7), the personal best particle is (0, 2, 6), and the global best particle is (0, 2, 5). First, performing the crossover on the fragment between the first locus and second locus of the ancestor particle and the personal best particle to generate the intermediate temporary particle (0, 2, 7); and then performing the crossover on the fragment between the second locus and third locus of the temporary particle and the global best particle, so as to generate the new particle (0, 2, 5). Such crossover calculation ensures that the particle swarm would gradually evolve towards a best direction.

In the present embodiment, the accuracy of the QoS prediction model is gradually improved, and the resulted target resource allocation scheme usually also changes. If the resource adjustment is carried out completely in accordance with the target allocation scheme, in each circulation, it is very likely that the virtual machines will be dynamically started or stopped, which leads to rising resource costs. Therefore, according to the difference between the allocated resource situation and the target allocation scheme in each circulation, the resource adjustment is made according to a certain proportion to gradually approach the best resource allocation scheme so as to reduce additional costs caused by startup of unnecessary virtual machines or stop of rented virtual machines.

Step S4 specifically comprises the following steps:

step S41: using formula (12) to denote the allocated resources situation $VM_{allocated}$, while using formula (13) to represent the target allocation scheme $VM_{Objective}$ obtained in each circulation, and denoting the difference $VM_{Difference}$ between the allocated resource situation $VM_{allocated}$ and the target allocation scheme $VM_{objective}$ by formula (14):

$$VM_{allocated} = \{vm_1^A, vm_2^A, vm_3^A, \ldots, vm_m^A\} \quad (12);$$

$$VM_{Objective} = \{vm_1^O, vm_2^O, vm_3^O, \ldots, vm_m^O\} \quad (13);$$

$$VM_{Difference} = \{vm_1^A - vm_1^O, vm_2^A - vm_2^O, vm_3^A - vm_3^O, \ldots, vm_m^A - vm_m^O\} \quad (14);$$

step S42: calculating an overall change trend between the allocated resource situation and the target allocation scheme in each circulation by using the following formula:

$$VM_{sum} = \sum_{L=1}^{m} VM_{Difference}(l); \quad (15)$$

when $VM_{sum} > 0$, it denotes that virtual machine resources of the cloud software service as a whole need to be increased, and the quantity of virtual machines are not reduced at this time; and when $VM_{sum} < 0$, it denotes that the virtual machine resources of the cloud software service have a remaining computing power, and the quantity of the virtual machines needs to be appropriately reduced instead of increasing the quantity of the virtual machines at this time;

step S43: assuming that the resource adjustment proportion is Proportion, and 0<Proportion<1, in order to ensure that the quantity adjusted each time for each type of the virtual machines is an integer, performing a rounding operation. As shown in formula (16), it is the quantity of the lth type of the virtual machines that needs to be adjusted, and, when VMAdjustement>0, it denotes adding VMAdjustement virtual machines of this type; on the contrary, VMAdjustement virtual machines of this type are reduced; wherein Intpart( ) is a rounding function, its meaning is as in formula (17). For a certain value a, if it is greater than or equal to 0, it is rounded up; if it is negative, it is rounded down.

$$VM_{adjustement}(l) = \text{Intpart}(VM_{Difference}(l) * \text{Proportion}) \quad (16);$$

$$intpart(a) = \begin{cases} a, & a \geq 0 \\ -intpart(-a), & a < 0 \end{cases}. \quad (17)$$

The present embodiment proposes a decision-making algorithm to calculate the resource allocation adjustment scheme, as shown in FIG. 5. If the value of each item in the array $VM_{Difference}$ is 0, it means that the current resource allocation scheme is the same as the target allocation scheme and does not need to be adjusted (Lines 3-4). Otherwise, guiding an overall trend, either increase or decrease, of the resource allocation according to the value of $VM_{sum}$ (Line 6). If the value of $VM_{sum}$ is greater than or equal to 0, the virtual machine resources will be increased (Lines 7-14); conversely, the allocated virtual machine resources will be reduced (Lines 15-23). For example, when the value of $VM_{sum}$ is greater than or equal to 0, if the $index^{th}$ value in the array $VM_{Difference}$ is a positive number, performing calculation on it according to proportion (Proportion) and then rounded (Intpart( )) the result to get the quantity $VM_{Adjustement}$(index) that needs to be adjusted (Lines 9-10); but If the $index^{th}$ value in the array $VM_{Difference}$ is a negative number, then directly taking 0 as the adjusted quantity (Lines 11-13). That is, when the overall trend is to increase virtual machine resources, even if the quantity of certain types of virtual machines needs to be reduced, neither the quantity of the virtual machines will be reduced nor the virtual machines will be stopped renting. Instead, the original quantity will continue to be maintained. Because "the overall trend is to increase the virtual machine resources" means that the currently allocated computing power cannot meet the current workload, in order to give priority to ensuring the level of the quality of service, only virtual machines are added firstly. Of course, if the level of the quality of service is guaranteed after adding virtual machines this time, but the virtual machine resources are redundant, algorithm 1 will automatically calculate the quantity of virtual machines that needs to be reduced in the next round of calculations (Lines 15-23).

Preferably, the method proposed in this embodiment is evaluated next. This embodiment mainly evaluates the effectiveness of the resource allocation method, the improvement of the accuracy of the QoS prediction model, and the performance of the self-correction method, and compares the method with the traditional resource allocation method and the rule-based method, so as to select three types of the virtual machines (small, medium, and large types of virtual machines).

Figure 7:
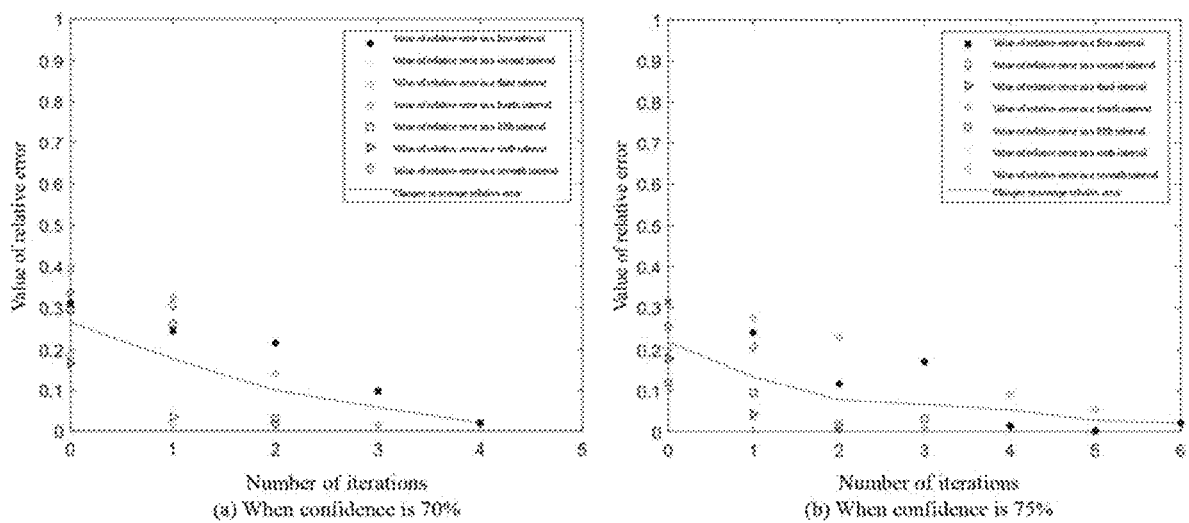
FIG. 7 is a relative error value of a QoS prediction model according to an embodiment of the present invention. Wherein (a) is when confidence is 70%, and (b) is when confidence is 75%.

For the workload category settings, it is divided into two categories: an only browse behavior (Only Browse) and other behaviors (Selling, Bidding, Rating, etc.). The specific workload changes are shown in FIG. 7, wherein a horizontal line segment represents the average workload quantity, and a bar graph represents the proportion of the two types of workloads. For the changes in the quantity of the workloads, initially, it is a slow increase, followed by a sudden decrease and a sudden increase, and finally a slow decrease. Such changes in the quantity of workloads are to verify the effectiveness of the method of the present invention for adaptively allocating resources. The whole experiment lasts for 7 hours, and the average load quantity in each hour is certain, and the quantity range is [3000, 5000].

The effectiveness evaluation of this embodiment is specifically as follows:

In this embodiment, the effectiveness of the self-correction method is evaluated based on the resource allocation situations under different workloads. Table 2 illustrates the resource allocation situations of the three different methods under the different workloads. From these tables, it can be seen that there are many factors that affect the resource allocation.

allocation under the two QoS prediction models. Taking the QoS prediction model with 75% confidence as an example. When the average workload rises from 4000 to 4500 (from the first interval to the second interval), the allocation situation of the virtual machines changes from <0, 2, 5> to <0, 4, 5>, and in this embodiment, 2 more virtual machines of Medium type would be allocated to respond to the increased 500 workloads; when the average workload drops from 5000 to 3000 (from the third interval to the fourth interval), the allocation situation of the virtual machines changes from <0, 5, 5> to <0, 0, 5>. Due to a sudden drop in the workload, in this embodiment, 5 redundant virtual

TABLE 2

Resource allocation situations of three adaptive resonice methods under different workloads

| Confidence | Resource allocation method | First interval | Second interval | Third interval | Fourth interval | Fifth interval | Sixth interval | Seventh interval |
|---|---|---|---|---|---|---|---|---|
| 75% | The present method | 0, 2, 5 | 0, 4, 5 | 0, 5, 5 | 0, 0, 5 | 0, 1, 7 | 0, 1, 7 | 0, 0, 6 |
|  | Traditional method | 0, 2, 6 | 0, 3, 6 | 0, 4, 6 | 0, 0, 6 | 0, 0, 8 | 0, 0, 8 | 0, 1, 6 |
|  | Rule-driven method | 0, 1, 7 | 0, 2, 7 | 0, 3, 7 | 0, 1, 6 | 0, 1, 8 | 0, 2, 7 | 0, 2, 6 |
| 70% | The present method | 0, 3, 5 | 0, 3, 6 | 0, 4, 6 | 0, 2, 5 | 0, 2, 7 | 0, 1, 7 | 0, 1, 5 |
|  | Traditional method | 0, 2, 7 | 0, 3, 7 | 0, 4, 7 | 0, 1, 6 | 0, 2, 8 | 0, 1, 8 | 0, 1, 7 |
|  | Rule-driven method | 0, 1, 7 | 0, 2, 7 | 0, 3, 7 | 0, 1, 6 | 0, 1, 8 | 0, 2, 7 | 0, 2, 6 |

Figure 6:
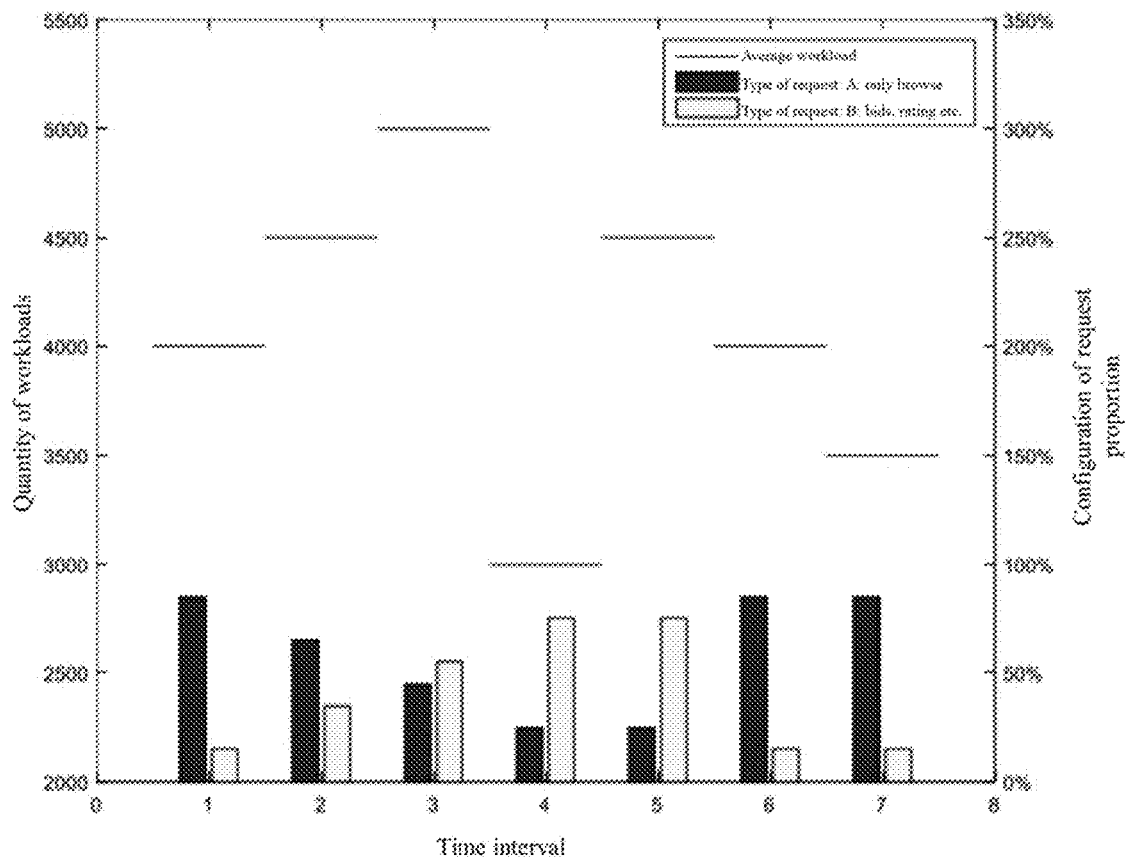
FIG. 6 is the changes of average workload quantity and proportion according to an embodiment of the present invention.

First, the average quantity of the workloads and the proportion of load types directly affect the resource allocation scheme. For example, for the first three intervals, it can be seen from FIG. 6 that the average quantity of the workloads and the proportion of load types are different. Correspondingly, each resource allocation method has a significant difference in the resources allocated among these three intervals; of course, within the same interval, the resources allocated by the three methods also have differences.

Second, the resource allocation situation in a previous interval will affect the resource allocation in the current interval. For example, it can be seen from FIG. 6 that the average quantity of the workloads and the proportion of the load types in the first interval and the sixth interval are the same. However, for the method of this embodiment and the traditional method, because the resource allocation in the sixth interval is affected by the allocated resource situation in the previous interval (the fifth interval) (because this embodiment considers that subtracting the allocated resources is costly), there is a difference between the resources allocated in the first interval and that in the sixth interval.

Third, the accuracy of the QoS prediction model will also affect the resource allocation scheme. For the two QoS prediction models with different accuracy in this embodiment, there is a difference between the resources allocated in each stage.

Finally, the three methods can all perform the adaptive resource allocation to a certain extent. For the self-correction method, it can effectively perform the adaptive resource machines of the Medium type would be stopped to ensure a minimum cost of the cloud resources. As above, regardless of the increase or decrease of the workload, the method of this embodiment can effectively perform the adaptive resource allocation.

The improvement of the accuracy of the prediction model in this embodiment is specifically as follows: for a given workload, the accuracy of the original QoS prediction model and the accuracy of the corrected QoS prediction model are compared in this embodiment, so as to evaluate the improvement of the accuracy of the QoS prediction model by the self-correction method. As shown in FIG. 7, in this embodiment, a relative error value R for each iteration is calculated. It can be seen that the self-correction method in this embodiment can significantly improve the accuracy of the QoS prediction model under the given workload.

First, improving the accuracy of the QoS prediction model is a gradual process. As the number of the feedback iterations increases, the relative error value of the model becomes smaller (discrete points of the same color in FIG. 7). For example, when the number of the feedback iterations is 0, the average relative error of the QoS prediction model with 75% confidence of is 0.23; when the number of the feedback iterations is 3, the average relative error is reduced to 0.08.

Second, in this embodiment, the accuracy of the two QoS prediction models with different accuracy can be effectively improved. For the QoS prediction model with 70% confidence, the influence of this embodiment is more obvious, and its accuracy is more effectively improved. For example, when the number of the feedback iterations is 0, the average relative error of the QoS prediction model with the 70% confidence is 0.26; when the number of feedback iterations is 3, the average relative error is reduced to 0.06. Compared with the QoS prediction model with the 75% confidence, after the same number of iterations, the original model with a low accuracy has been improved more effectively, wherein the average relative error value for the 70% confidence drops by 0.20, while the average relative error value for the 75% confidence drops by 0.15.

Finally, regardless of the accuracy, the accuracy of the two QoS prediction models has been effectively improved after a complete iterative process, and finally maintains at a very low relative error level. For example, after 5 feedback iterations, the relative error value of the QoS prediction model with the 70% confidence is reduced by 24% on average; while the relative error value of the QoS prediction model with the 75% confidence is reduced by 20% on average after 7 feedback iterations. Finally, the relative errors of the two are both maintained at about 0.02.

The performance evaluation of the method in this embodiment is specifically as follows:

For the comparison of adaptive resource allocation performance, in this embodiment, an objective function value (that is, the fitness value) for verification is directly used. The better a good resource allocation scheme, the smaller the fitness value.

Figure 8:
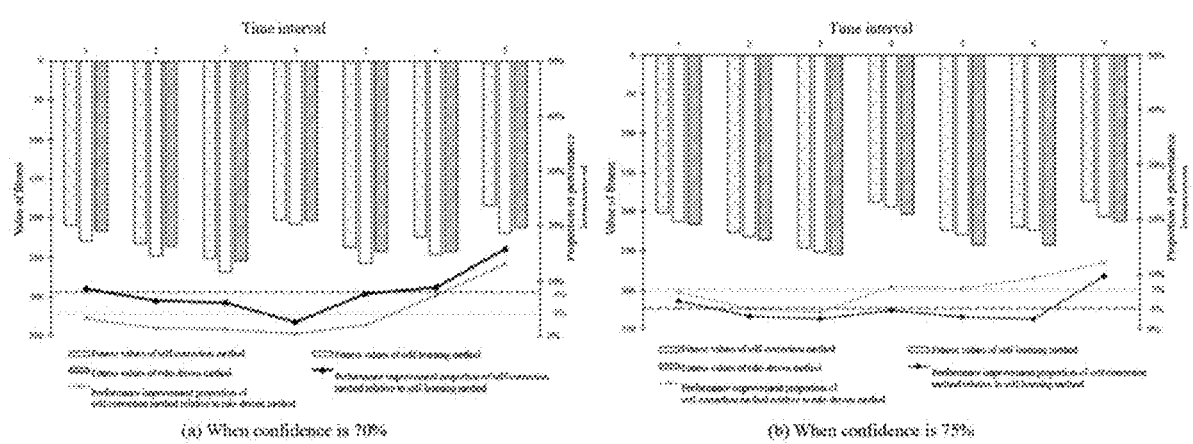
FIG. 8 is a performance comparison of three adaptive resource allocation methods according to an embodiment of the present invention. Wherein (a) is when confidence is 70%, and (b) is when confidence is 75%.

As shown in FIG. 8, compared with the traditional method, when the confidence is 70%, the self-correction method can improve the performance by 8% on average; when the confidence is 75%, it can improve the performance by 4% on average. In both cases of confidence, the performance of the self-correction method is improved compared with the traditional method. This is because that the accuracy of the QoS prediction model will affect the final resource allocation scheme. However, the method in this embodiment can continuously improve the accuracy of the QoS prediction model, and the lower the accuracy of the original model, the better the improvement effect. Based on the model with improved accuracy, the particle swarm optimization algorithm can search for a better resource allocation scheme. Moreover, compared with the traditional method, when the accuracy of the QoS prediction model is not high, the resource allocation scheme of the method in this embodiment is better and the performance is better.

As shown in FIG. 8, compared with the traditional rule-driven method, when the confidence is 70%, the method in this embodiment can improve the performance by 4% on average; when the confidence is 75%, it can improve the performance by 7% on average. Since the rule-driven method follows the rules described in Tables 6-8 and does not depend on the accuracy of the QoS prediction model; while the method in this embodiment uses the QoS prediction model, of which the accuracy will affect the performance of the resource allocation. When an accurate QoS prediction model is used, this embodiment can obtain the best resource allocation scheme, so that the performance is significantly improved compared to the rule-driven method. In fact, the setting of the rules needs to be tailored to different cloud software services, while considering SLA requirements, performance of various types of virtual machines etc., which will increase the dependence on cloud engineers and the difficulty of management. The QoS prediction models of the two methods in this embodiment are obtained based on the machine learning method, and are self-learning. For different cloud software services, as long as the required dataset is collected, the QoS prediction model can be obtained after training. Meanwhile, when the accuracy of the QoS prediction model is not high enough, the method in this embodiment provides a model correction method based on the self-correction control theory, which can continuously improve the accuracy of the QoS prediction model.

A person skilled in the art should understand that the embodiment of the invention can be provided as a method, a system or a computer program product. Therefore, the present application can adopt the forms of an entirely hardware embodiment, an entirely software embodiment or an embodiment combining hardware and software elements. Furthermore, the present application can adopt the form of a computer program product which can be executed by one or more computer usable storage mediums containing computer usable program codes therein (including but not limited to magnetic disk memory, CD-ROM, optical memory and the like).

The present application is described with reference to the flow charts and/or block diagrams of the method, device (system) and computer program product according to the embodiments of the present application. It will be understood that each flowchart and/or block in flowchart illustrations and/or block diagrams and the combination between flowchart and/or block in flowchart illustrations and/or block diagrams can be achieved by computer program instructions. These computer instructions can be provided to a general-purpose computer, a specialized computer, an embedded processor, or the processor of other programmable data equipment so as to give rise to a machine with the result that the commands executed through the computer or processor of other programmable data equipment give rise to a device that is used to realize the functions designated by one or more processes in a flow chart and/or one or more blocks in a block diagram.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the specified function in a flow chart and/or one or more blocks in a block diagram.

Such computer program instructions can also be loaded on computers or other programmable data processing equipment so as to carry out a series of operation steps on computers or other programmable equipment to generate the process to be achieved by computers, so that the commands to be executed by computers or other programmable equipment achieve the one or multiple flows in the flowchart and/or the functions specified in one block or multiple blocks of the block diagram.

The above are only preferred embodiments of the present invention, and are not intended to limit the present invention in other forms. Any skilled person familiar with the art may change or modify the technical content disclosed above to obtain the equivalent embodiments. However, any simple modifications, equivalent changes and variations made to the above embodiments based on the technical essence of the present invention without departing from the content of the technical solution of the present invention still belong to the protection scope of the technical solution of the present invention.

What is claimed is:

1. A cloud software service resource allocation method based on QoS model self-correction, characterized in that the method comprises the following steps:

step S1: performing online self-learning to obtain a QoS prediction model;

step S2: collecting runtime data under a certain workload, and improving the accuracy of the QoS prediction model under a current workload through self-correction control;

step S3: constructing a fitness function in combination with a quality of service (QOS) and a cloud resource cost (Cost), and searching for a target resource allocation scheme by using the following steps of:

step S31: assuming that there are m types of virtual machines, a quantity of each type of virtual machines is expressed as $vm_l$, wherein $1 \leq l \leq m$, then defining the particle coding of a certain resource allocation scheme as the following formula:

$$VM = \{vm_1, vm_2, vm_3, \ldots, vm_m\} \quad (10);$$

initializing a values of related parameters, including but not limited to a particle swarm size, a maximum number of iterations and an initial particle swarm size;

step S32: calculating a fitness value of each particle according to the following formula, setting each particle as its own personal best particle, and setting the particle with a minimum fitness value as a global best particle:

$$\text{Fitness} = \text{Objective} \quad (11)$$
$$= r_1 \frac{1}{QoS} + r_2 \text{Cost};$$

wherein $r_1$ denotes trade-off of the quality of service (QOS), and $r_2$ denotes trade-off of the cloud resource cost;

step S33: updating the particles according to mutation and crossover calculations, and recalculating a fitness value of each particle;

step S34: if the fitness value of the updated particle is better than its personal best particle, replacing the personal best particle with the updated particle;

step S35: if the fitness value of the updated particle is better than a global best particle, replacing the global best particle with the updated particle;

step S36: returning to step S33 until a stop condition is met;

step S4 specifically comprises the following steps of:

step S4: comparing a current resource allocation situation with the searched target resource allocation scheme to obtain a difference there between, and then adjusting resources according to a proportion;

the step S4 comprises the steps of:

step S41: using formula (12) to denote the allocated resources situation $VM_{allocated}$, while using formula (13) to represent the target allocation scheme $VM_{Objective}$ obtained in each circulation, and denoting the difference $VM_{Difference}$ between the allocated resource situation $VM_{allocated}$ and the target allocation scheme $VM_{objective}$ by formula (14):

$$VM_{allocated} = \{vm_1^A, vm_2^A, vm_3^A, \ldots vm_m^A\} \quad (12);$$

$$VM_{Objective} = \{vm_1^O, vm_2^O, vm_3^O, \ldots, vm_m^O\} \quad (13);$$

$$VM_{Difference} = \{vm_1^A - vm_1^O, vm_2^A - vm_2^O, vm_3^A - vm_3^O, \ldots, vm_m^A - vm_m^O\} \quad (14);$$

step S42: calculating the overall change trend between the allocated resource situation and the target allocation scheme in each circulation by using the following formula:

$$VM_{sum} = \sum_{L=1}^{m} VM_{Difference}(l); \quad (15)$$

when $VM_{sum} > 0$, it denotes that virtual machine resources of the cloud software service VM sum as a whole need to be increased, and the quantity of virtual machines are not reduced at this time; and when $VM_{sum} < 0$, it denotes that the virtual machine resources of the cloud software sum service have a remaining computing power, and the quantity of the virtual machines needs to be appropriately reduced instead of increasing the quantity of the virtual machines at this time;

step S43: assuming that the resource adjustment proportion is Proportion, and 0<Proportion<1, in order to ensure that the quantity adjusted each time for each type of the virtual machines is an integer, performing a rounding operation, as shown in formula (16), it is the quantity of the lth type of the virtual machines that needs to be adjusted, and, when VMAdjustement>0, it denotes adding VMAdjustement virtual machines of this type: on the contrary, VMAdjustement virtual machines of this type are reduced; wherein Intpart( ) is a rounding function;

$$VM_{adjustement}(l) = \text{Intpart}(VM_{Difference}(l) * \text{Proportion}) \quad (16);$$

step S5: repeating steps S2 to S4 until the current resource allocation situation is the same as the target resource allocation scheme which means that resource adjustment is completed.

2. The cloud software service resource allocation method based on QoS model self-correction according to claim 1, characterized in that step S1 specifically comprises: firstly establishing a service quality mapping function for response time, so that the quality of service can be better reflected; and then establishing a relationship model among workloads, allocated resources and the quality of service through machine learning, and initializing the obtained QoS prediction model for a next step S2.

3. The cloud software service resource allocation method based on QoS model self-correction according to claim 1, characterized in that in step S1, the QoS prediction model takes a load request situation (R) and an allocated virtual machine situation (VM) as inputs, and takes the quality of service (QOS) as an output, so as to establish a unified nonlinear regression model as shown in the following formula:

$$QoS = \sum_{l=0}^{m+n} w_l x_{c,l}^{p_l} \quad (1)$$

wherein the independent variable X is a set of load requests R and virtual machine allocation situations VM; the workload, i.e., $R = \{x_{c,1}, x_{c,2}, \ldots, x_{c,n}\}$ denotes that there are n types of the load requests, wherein $x_{c,l}$ denotes the quantity of the lth type of the load requests; the resource allocation situations are $VM = \{x_{c,n+1}, x_{c,n+2}, \ldots, x_{c,n+m}\}$, denoting that there are m types of virtual machines, wherein $x_{c,n+l}$ denotes the quantity of the lth type of the virtual machines; the exponential variable Parameter=$\{p_1, p_2, \ldots, p_{n+m}\}$ is an exponential parameter of the independent variable X; and, when values of Parameter are all 1, the above formula becomes a linear regression model, and the parameter $W=\{w_0, w_1, \ldots, w_{n+m}\}$ in the formula is the parameter required to be solved and corrected.

4. The cloud software service resource allocation method based on QoS model self-correction according to claim 1, characterized in that, step S2 comprises two parts: parameter recursive estimation and parameter calculation, wherein the parameter recursive estimation is continuously estimating parameters of the QoS prediction model based on input and output information of the system; and the parameter calculation is calculating and tuning original parameters of the QoS prediction model and new parameter estimates, and updating the QoS prediction model with final calculation results to make the prediction performance of the QoS prediction model reach a best state or approach a best state.

5. The cloud software service resource allocation method based on QoS model self-correction according to claim 3, characterized in that, step S2 specifically comprises the following steps of:

step S21: for the certain workload, in a continuous resource adjustment process, assuming that u groups of the runtime data are collected, including workloads, a virtual machine allocation situation and actual values $QOS_{actual}$ of Qos; based on the workloads and the virtual machine allocation situation, obtaining the following u QoS prediction equations according to a formula $$QoS = \sum_{L=0}^{m \times n} w_i x_{c,i}^{p_l};$$

$$QoS_{predicted\ 1} = w_0 = w_1 x_{1,1}^{p_2} + w_2 x_{1,2}^{p_2} + \ldots + w_{n+m} x_{1,n+m}^{p_{n+m}} \quad (2)$$

$$QoS_{predicted\ 2} = w_0 = w_1 x_{2,1}^{p_1} + w_2 x_{2,2}^{p_2} + \ldots + w_{n+m} x_{2,n+m}^{p_{n+m}}$$

$$QoS_{predicted\ 3} = w_0 = w_1 x_{3,1}^{p_1} + w_2 x_{3,2}^{p_2} + \ldots + w_{n+m} x_{3n+m}^{p_{n+m}}$$

$$QoS_{predicted\ u} = w_0 = w_1 x_{u,1}^{p_1} + w_2 x_{u,2}^{p_2} + \ldots + w_{n+m} x_{u,n+m}^{p_{n+m}};$$

step S22: denoting formula (2) in a vector-matrix form as follows:

$$\begin{bmatrix} QoS_{predicted\ 1} \\ QoS_{predicted\ 2} \\ QoS_{predicted\ 3} \\ \vdots \\ QoS_{predicted\ u} \end{bmatrix} = \begin{bmatrix} 1 & x_{1,1}^{p_1} & x_{1,2}^{p_2} & \ldots & x_{1,n+m}^{p_{n+m}} \\ 1 & x_{2,1}^{p_1} & x_{2,2}^{p_2} & \ldots & x_{3,n+m}^{p_{n+m}} \\ 1 & x_{3,1}^{p_1} & x_{3,2}^{p_2} & \ldots & x_{3n+m}^{p_{n+m}} \\ \vdots & \vdots & \vdots & \vdots & \vdots \\ 1 & x_{u,1}^{p_1} & x_{u,2}^{p_2} & \ldots & x_{u,n+m}^{p_{n+m}} \end{bmatrix} \times \begin{bmatrix} w_0 \\ w_1 \\ w_2 \\ \vdots \\ w_{n+m} \end{bmatrix} \quad (3)$$

letting Y denote a vector composed of u predicted output QOS values, wherein W is a parameter vector of n+m+1 dimensions, and, $\Phi$ denote a input matrix of u*(n+m+1) dimensions, that is, letting:

$$Y = \begin{bmatrix} QoS_{predicted\ 1} \\ QoS_{predicted\ 2} \\ QoS_{predicted\ 3} \\ \vdots \\ QoS_{predicted\ u} \end{bmatrix}, W = \begin{bmatrix} w_0 \\ w_1 \\ w_2 \\ \vdots \\ w_{n+m} \end{bmatrix}, \quad (4)$$

$$\Phi = \begin{bmatrix} 1 & x_{1,1}^{p_1} & x_{1,2}^{p_2} & \ldots & x_{1,n+m}^{p_{n+m}} \\ 1 & x_{2,1}^{p_1} & x_{2,2}^{p_2} & \ldots & x_{2,n+m}^{p_{n+m}} \\ 1 & x_{3,1}^{p_1} & x_{3,2}^{p_2} & \ldots & x_{3,n+m}^{p_{n+m}} \\ \vdots & \vdots & \vdots & \vdots & \vdots \\ 1 & x_{u,1}^{p_1} & x_{u,2}^{p_2} & \ldots & u_{1,n+m}^{p_{n+m}} \end{bmatrix};$$

simplifying formula (3) into the following vector-matrix equation:

$$Y = \Phi W \quad (5);$$

for the collected actual quality of service values and actual values $Qos_{actual}$, it is a best estimate of $QoS_{predicted}$, indicated as Y; let W denote a best estimate of W, then:

$$Y = \Phi W \quad (6);$$

step S23: performing parameter estimation by using a least square method, wherein the squared difference of the residual between the predicted QoS value and the actual QOS value needs to be minimized; and wherein a vector form of the residual is expressed as follows:

$$e = \begin{bmatrix} e_1 \\ e_2 \\ e_3 \\ \vdots \\ e_u \end{bmatrix} = \begin{bmatrix} QoS_{predicted\ 1} - QoS_{actual\ 1} \\ QoS_{predicted\ 2} - QoS_{actual\ 1} \\ QoS_{predicted\ 3} - QoS_{actual\ 1} \\ \vdots \\ QoS_{predicted\ u} - QoS_{actual\ 1} \end{bmatrix}; \quad (7)$$

the squared difference of the residual, that is, the index function is denoted as follows:

$$J = e^T e = (Y - \Phi W)^T (Y - \Phi W) \quad (8);$$

taking a derivative of J by W, that is, taking $$\frac{\partial J}{\partial W},$$

so that W can be solved out;

step S24: performing a proportion tuning on the original coefficient vector W and the W obtained in step S23, as shown in the following formula:

$$W = \eta W + (1 - \eta) W \quad (9);$$

wherein $\eta$ is a parameter, and a higher value of $\eta$ indicates a higher confidence proportion to the original parameter.

* * * * *